United States Patent
Riemenschneider

[11] Patent Number: 5,802,868
[45] Date of Patent: *Sep. 8, 1998

[54] SADDLE TYPE ADSORBENT UNIT

[75] Inventor: Paul A. Riemenschneider, Williamsville, N.Y.

[73] Assignee: Multisorb Technologies, Inc., Buffalo, N.Y.

[*] Notice: The term of this patent shall not extend beyond the expiration date of Pat. No. 5,636,525.

[21] Appl. No.: 847,380

[22] Filed: Apr. 24, 1997

Related U.S. Application Data

[63] Continuation-in-part of Ser. No. 626,464, Apr. 2, 1996, Pat. No. 5,636,525.

[51] Int. Cl.⁶ .............................. F25B 43/00; B01D 59/26
[52] U.S. Cl. ................................................ 62/474; 96/147
[58] Field of Search ............................. 62/474, 503, 509, 62/512, 298, 475; 55/515; 96/133, 147

[56] References Cited

U.S. PATENT DOCUMENTS

| | | | |
|---|---|---|---|
| 4,116,649 | 9/1978 | Cullen et al. | 55/387 |
| 4,276,756 | 7/1981 | Livesay | 62/503 |
| 4,401,447 | 8/1983 | Huber | 55/387 |
| 4,405,347 | 9/1983 | Cullen et al. | 62/503 X |
| 4,457,843 | 7/1984 | Cullen et al. | 210/282 |
| 4,464,261 | 8/1984 | Cullen et al. | 210/282 |
| 4,619,673 | 10/1986 | Cullen et al. | 55/387 |
| 4,911,739 | 3/1990 | Cullen et al. | 62/503 |
| 4,994,185 | 2/1991 | Cullen et al. | 210/282 |
| 5,036,972 | 8/1991 | Cullen et al. | 206/204 |
| 5,347,829 | 9/1994 | Newman | 62/474 |
| 5,636,525 | 6/1997 | Riemenschneider | 62/474 |
| 5,651,266 | 7/1997 | Hutchison et al. | 62/503 |

Primary Examiner—William Doerrler
Attorney, Agent, or Firm—Joseph P. Gastel

[57] ABSTRACT

A saddle type adsorbent unit including first and second porous fabric adsorbent containers, a connecting member connecting the first and second containers and for placement between the upstanding pipe portions of a U-shaped pipe of a receiver, tabs on the outer ends of the adsorbent containers having apertures therein for receiving a filter housing on the underside of a return bend of the U-shaped pipe to thereby fixedly mount the saddle type adsorbent unit onto the U-shaped pipe.

39 Claims, 5 Drawing Sheets

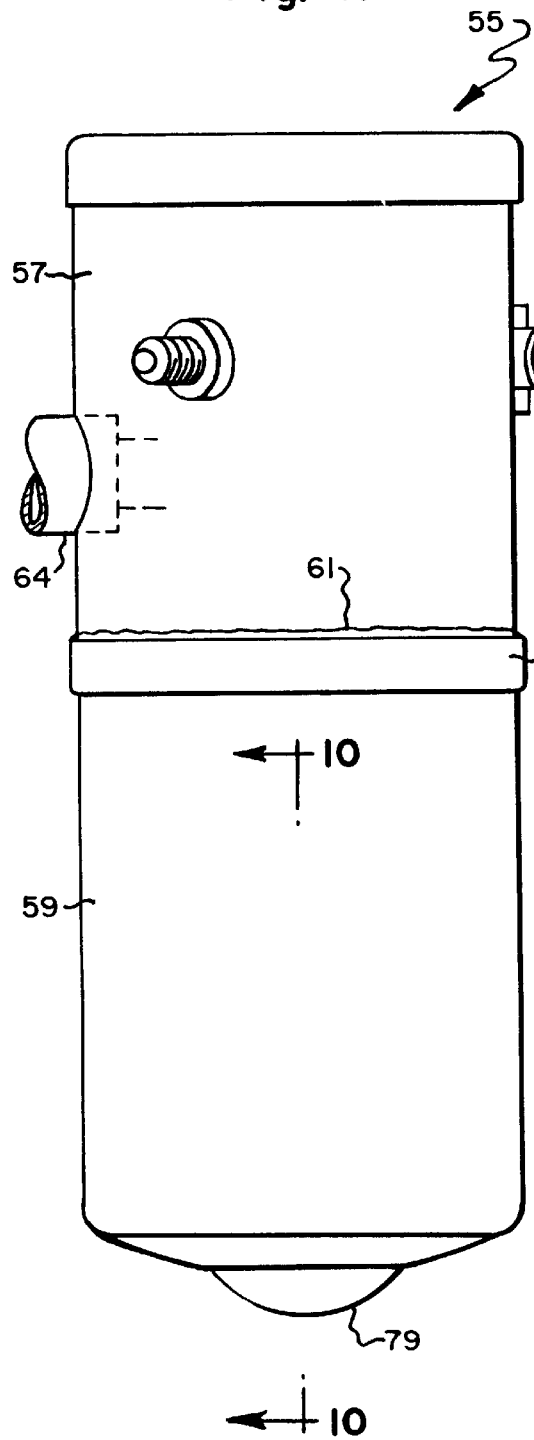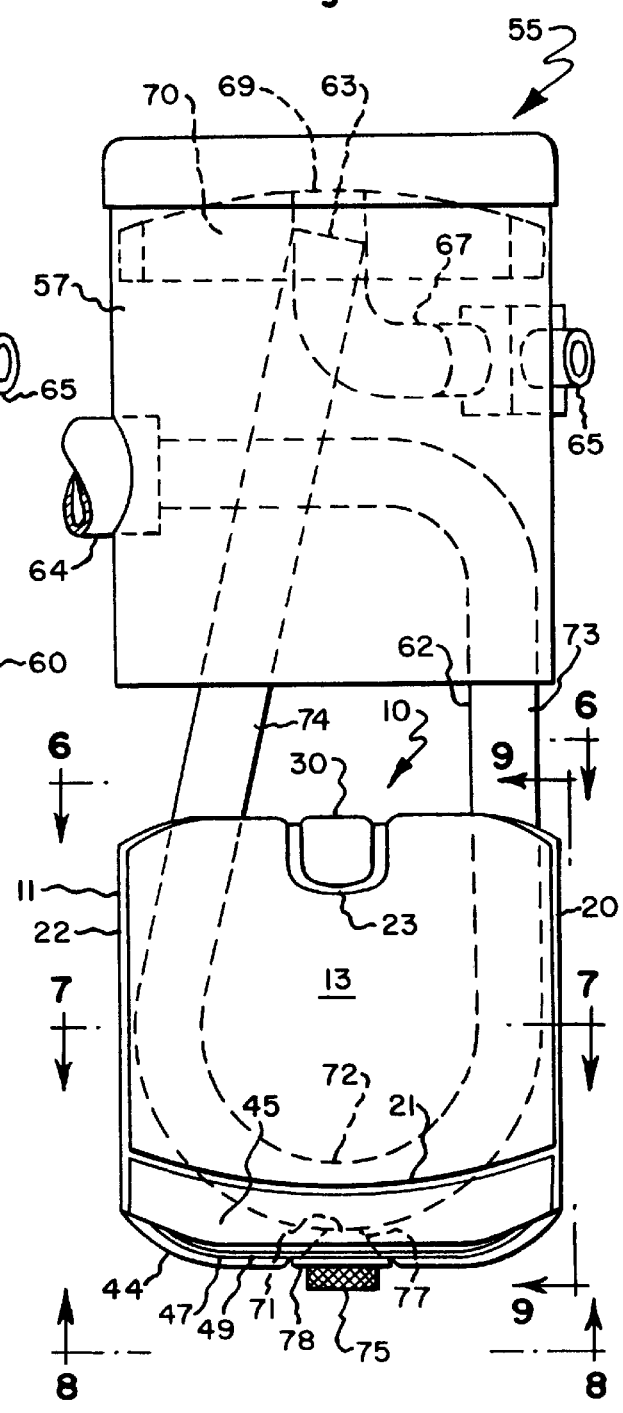

Fig. 12.
Fig. 13.
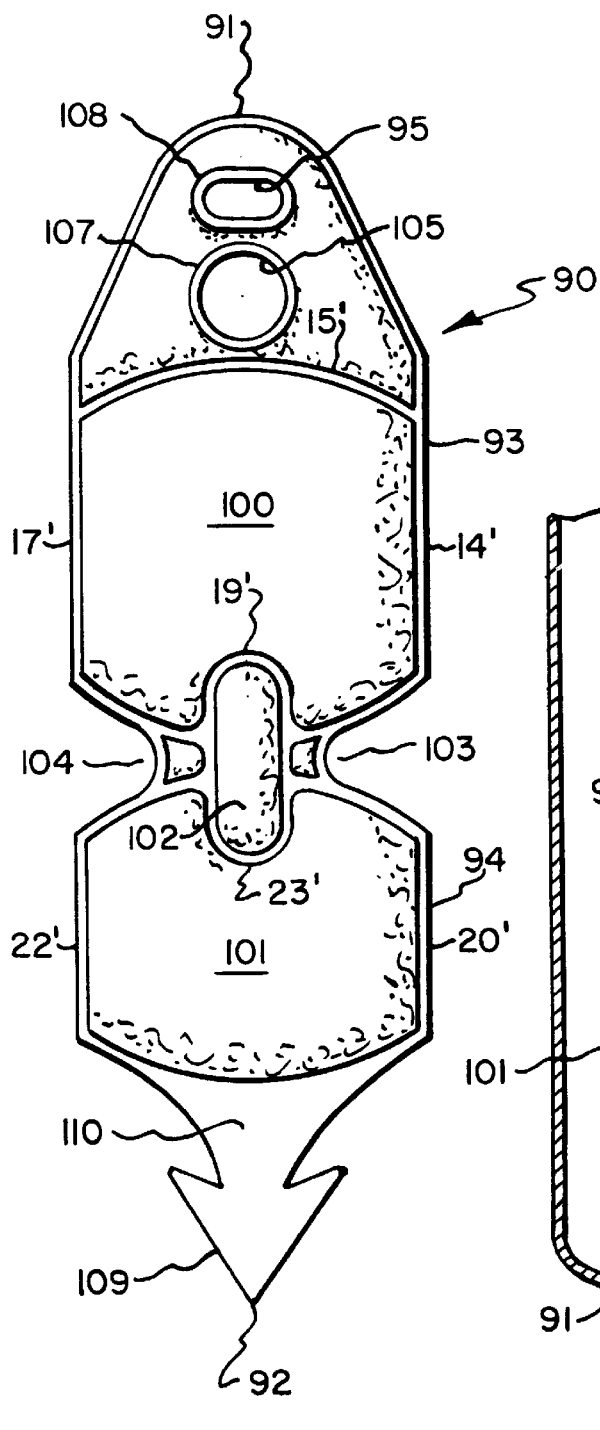
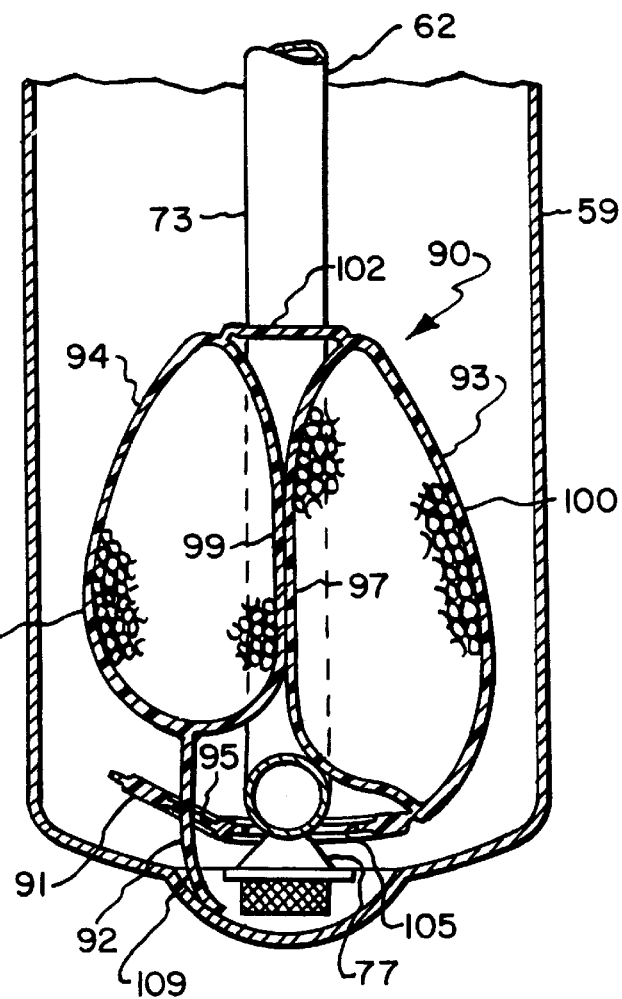

5,802,868

SADDLE TYPE ADSORBENT UNIT

CROSS-REFERENCE TO RELATED APPLICATIONS

The present application is a continuation-in-part of application Ser. No. 08/626,464, filed Apr. 2, 1996, now U.S. Pat. No. 5,636,525.

BACKGROUND OF THE INVENTION

The present invention relates to an improved saddle type adsorbent unit for use in a refrigerant receiver of an air conditioning system.

By way of background, there are numerous saddle types of adsorbent units used in refrigerant receivers. Units of this type usually have a yoke which both connects two spaced adsorbent containers and is placed underneath the return bend of a U-shaped pipe. In the past straps or other types of ties were used to bind the two adsorbent containers about the U-shaped pipe prior to installing the U-shaped pipe into the receiver housing.

BRIEF SUMMARY OF THE INVENTION

It is accordingly one object of the present invention to provide an entirely self-contained saddle type of adsorbent unit which can be positively mounted on a U-bend pipe without the use of straps or ties.

Another object of the present invention is to provide an improved saddle type adsorbent unit which can be positively oriented laterally of a U-shaped pipe by its inherent structure, namely, a connecting member which connects the two spaced adsorbent containers of the adsorbent unit.

A further object of the present invention is to provide an improved saddle type adsorbent unit which includes structure, namely, a tab arrangement for cooperating with existing filter structure on a U-shaped pipe for positively locking the adsorbent unit in position on the U-shaped pipe.

Yet another object of the present invention is to provide an improved saddle type adsorbent unit wherein pronounced convex surfaces of spaced adsorbent containers are caused to press against each other when the adsorbent unit is mounted on a U-shaped pipe to thereby aid in retaining the adsorbent unit in a fixed mounted position on the U-shaped pipe.

A still further object of the present invention is to provide an improved saddle type adsorbent unit which is so dimensioned that pronounced convex surfaces of spaced adsorbent container portions thereof are caused to engage portions of the U-shaped pipe in substantially complementary mating relationship to thereby further positively mount the adsorbent unit against movement on the U-shaped pipe. Other objects and attendant advantages of the present invention will readily be perceived hereafter.

The present invention relates to an adsorbent unit comprising first and second porous fabric adsorbent containers, adsorbent in said first and second containers, inner and outer end portions on said first and second containers, a connecting member connecting said inner end portions of said first and second containers, a first tab extending outwardly from said outer end portion of said first container, a second tab extending outwardly from said outer end portion of said second container, and an aperture in at least one of said first and second tabs for mounting said tab on an external structural member.

The present invention also relates to an improved adsorbent unit in association with a refrigerant receiver having a housing with a bottom wall and a side wall and a U-shaped pipe with a return bend adjacent said bottom wall and with first and second pipe portions extending upwardly from said return bend along said side wall, said refrigerant receiver also including a filter body extending outwardly from said return bend, the improved adsorbent unit comprising first and second porous fabric adsorbent containers, adsorbent in said first and second containers, inner and outer end portions on said first and second containers, a connecting member connecting said inner end portions of said first and second containers, said connecting member being positioned between said first and second pipe portions in a position spaced from said return bend, a tab extending outwardly from said outer end portion of said first container, and an aperture in said first tab mounting said first tab on said filter body.

The various aspects of the present invention will be more fully understood when the following portions of the specification are read in conjunction with the accompanying drawings wherein:

BRIEF DESCRIPTION OF THE SEVERAL VIEWS OF THE DRAWING

FIG. 4 is a side elevational view of an accumulator type of receiver in which the adsorbent unit is mounted;

FIG. 5 is a side elevational view of the accumulator of FIG. 4 with the bottom portion removed and with the adsorbent unit of the present invention mounted relative to the U-bend pipe therein;

FIG. 12 is a plan view of another embodiment of the present invention; and

FIG. 13 is a fragmentary cross sectional view similar to FIG. 10 but showing the embodiment of FIG. 12 mounted relative to a U-bend pipe in a receiver.

DETAILED DESCRIPTION OF THE INVENTION

Figure 1:
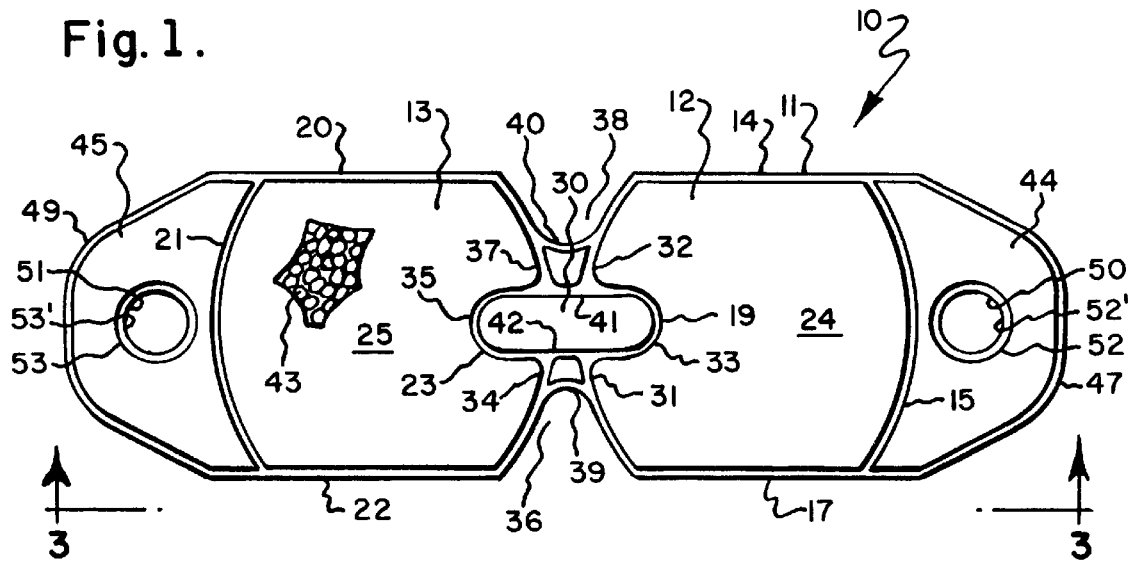
FIG. 1 is a partially broken away plan view of one embodiment of the adsorbent unit of the present invention showing the pronounced convex surface portions thereof.

The saddle type adsorbent unit 10 of the present invention includes a casing 11 formed of porous material, in this instance, heat-fusible felted polyester, but it may be fabricated of any other suitable material. Casing 11 is formed from two sides of the felted polyester which are bonded to each other by fused seams, and it comprises two bags or containers 12 and 13 containing adsorbent with the inner edges of the containers connected to each other by a connecting member and the outer edges of the contains having apertured tabs extending outwardly therefrom, as described in detail hereafter. Container 12 is defined by fused seams 14, 15, 17 and 19. Container 13 is defined by fused seams 20, 21, 22 and 23. Containers 12 and 13 have pronounced convex surfaces 24 and 25, respectively, and less pronounced convex surfaces 27 and 29, respectively. A substantially planar connecting member 30 joins containers 12 and 13. Connecting member 30 is defined by portions 31, 32 and 33 of fused seam 19 and by portions 34, 35 and 37 of fused seam 23 and by fused seams 39 and 40. Connecting member 30 is connected to the inner ends of containers 12 and 13 by the portions of the fused seams which lie therebetween. Fused seams 39 and 40 define the outer ends of connecting member 30. In addition, fused seams 41 and 42 extend between seams 33 and 35. Arcuate cutouts or spaces 36 and 38 are located at the ends of connecting member 30 between containers 12 and 13. Cutout or space 36 is deeper than cutout or space 38. The containers 12 and 13 contain adsorbent 43, namely, molecular sieve but they may contain any other suitable adsorbent, as is well known in the art.

A tab 44 is formed integrally with the outer end of container 12 and extends outwardly of fused seam 15. A tab 45 is formed integrally with the outer end of container 13 and extends outwardly of fused seam 21. A fused seam 47 defines the outer edge of tab 44 and a fused seam 49 defines the outer edge of tab 45. Fused seam 47 is essentially a continuation of fused seams 14 and 17, and fused seam 49 is essentially a continuation of fused seams 20 and 22. Holes or apertures 50 and 51 are located in tabs 44 and 45, respectively, and holes 50 and 51 are defined by grommet-like fused seams 52 and 53, respectively. As will become more apparent hereafter, when tabs 44 and 45 are secured in position, they constitute an anchoring yoke.

Figure 10:
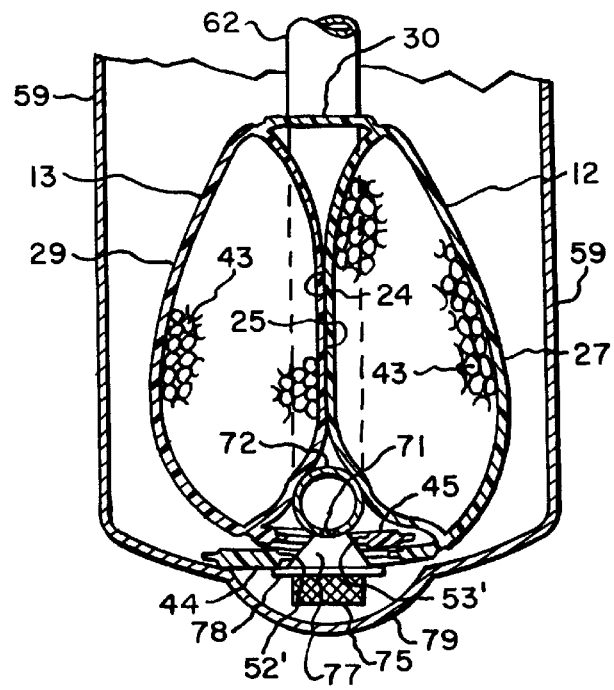
FIG. 10 is a cross sectional view taken substantially along line 10—10 of FIG. 4 and showing the adsorbent unit mounted on the U-bend pipe.

The adsorbent unit 10 is intended to be mounted in a prior art accumulator-type of receiver 55 which includes an upper cylindrical housing portion 57 and a lower cylindrical housing portion 59 having a flange 60 which receives the lower edge portion of upper portion 57 with an interference fit, and the joint is thereafter hermetically welded at 61. Insofar as pertinent here, the accumulator 55 includes a U-bend pipe 62 having a refrigerant inlet end 63 which receives gaseous refrigerant which then passes through U-bend pipe 62 and discharges it through outlet end 64 leading to a compressor. The liquid refrigerant from the evaporator enters accumulator inlet 65 which then passes through conduit 67 and exits conduit 67 from outlet 69 above cup-shaped baffle 70. The liquid refrigerant then drops to the lower portion of the accumulator while the gaseous portion rises to the upper portion of the accumulator from which it enters U-bend pipe inlet 63. A lubricant inlet 71 is located at the underside of the return bend 72 of U-bend pipe 62. The U-bend pipe 62 includes a relatively vertical pipe portion 73 and an inclined pipe portion 74 which are connected by U-bend 72. A filter 75 (FIG. 10) is located at the underside of frustoconical filter housing 77 which is in communication with lubricant inlet 71 in return bend 72.

Figure 6:
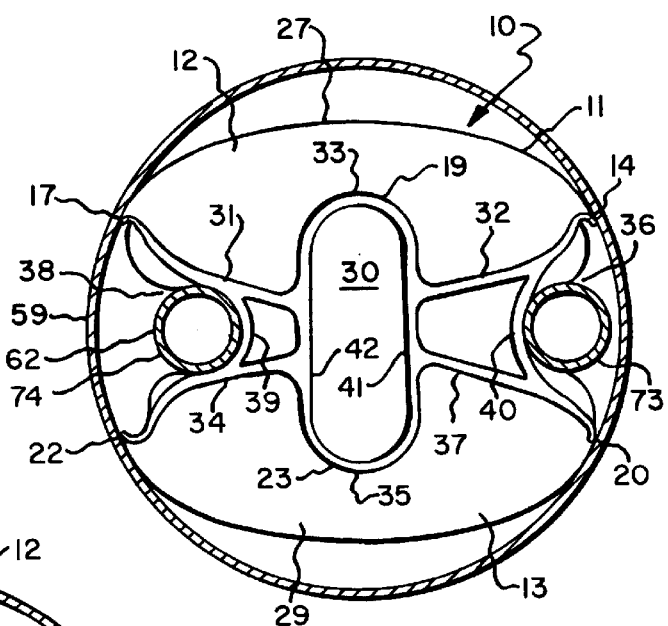
FIG. 6 is a cross sectional view taken substantially along line 6—6 of FIG. 5 and showing the connecting portion between the desiccant containers of the adsorbent unit located between the pipe portions of the U-bend pipe.
Figure 7:
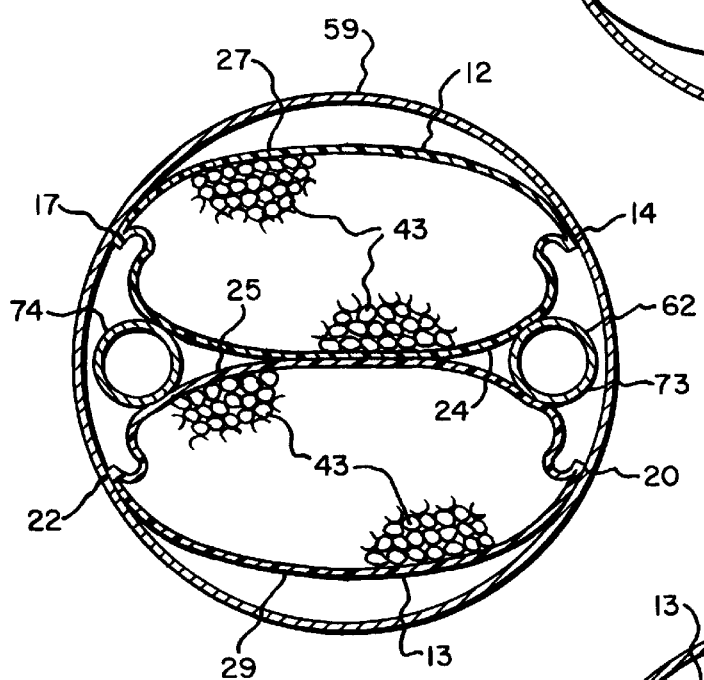
FIG. 7 is a cross sectional view taken substantially along line 7—7 of FIG. 5 and showing the pronounced convex portions of the adsorbent containers located between the pipe portions of the U-bend pipe.
Figure 8:
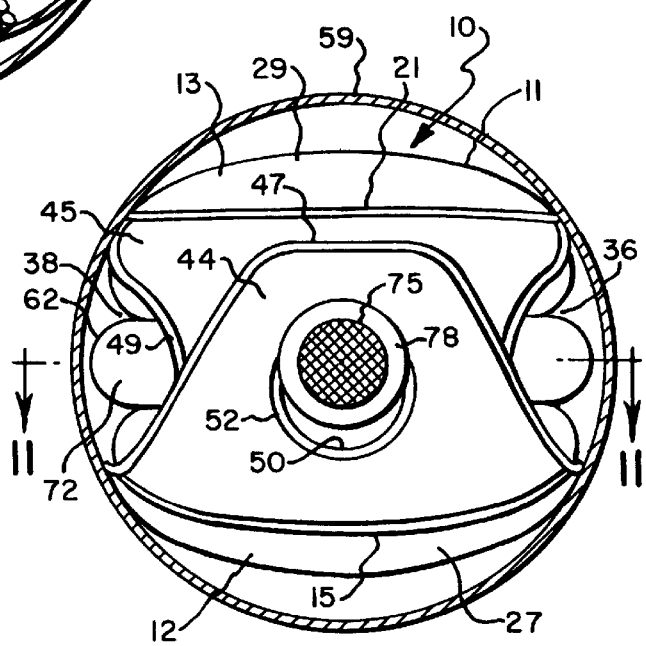
FIG. 8 is a view taken substantially in the direction of arrows 8—8 of FIG. 5 and showing the tabs at the outer ends of the containers mounted in lapped relationship on the body of the filter on the return bend of the U-bend pipe.
Figure 9:
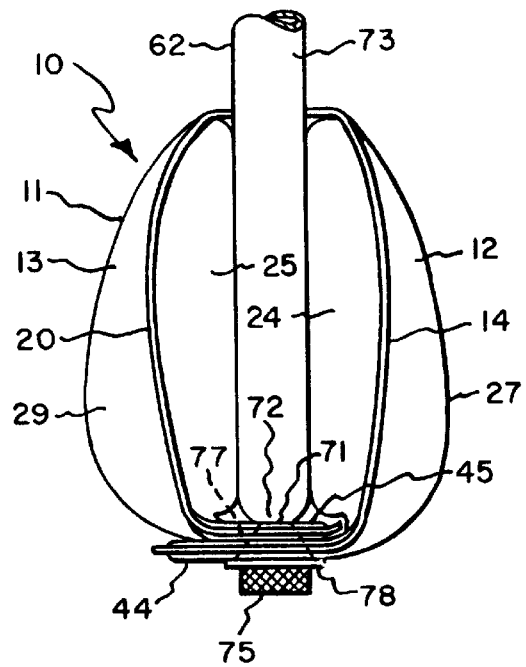
FIG. 9 is a fragmentary cross sectional view taken in the direction of arrows 9—9 of FIG. 5.

The manner in which adsorbent unit 10 is installed relative to U-bend tube 62 is depicted in FIGS. 5–10. More specifically, the connecting member 30 is placed between tube portions 73 and 74. The arcuate cutout or space 38 proximate fused seam 40 is shallower than the arcuate cutout or space 36 proximate fused seam 39. Thus, when the connecting member 30 is placed between pipe portions 73 and 74, the cutout 38 receives vertical pipe portion 73 and the cutout 36 receives inclined pipe portion 74. In this position the fused seam 40 which defines one edge of connecting member 30 lies immediately adjacent pipe portion 73 and fused seam 39 which defines the opposite edge of connecting member 30 lies immediately adjacent pipe portion 74, as shown in FIG. 6. Thus, the connecting member 30 positions the adsorbent unit 10 laterally between pipe portions 73 and 74. The foregoing lateral positioning causes the adsorbent unit 10 to occupy a position wherein seams 14, 17, 20 and 22 (FIGS. 5–7) are substantially parallel to the inner surface of lower accumulator portion 59. It will be appreciated that the distance between fused seams 39 and 40 can be varied to accommodate different spacings between pipe portions, such as 73 and 74.

Figure 2:
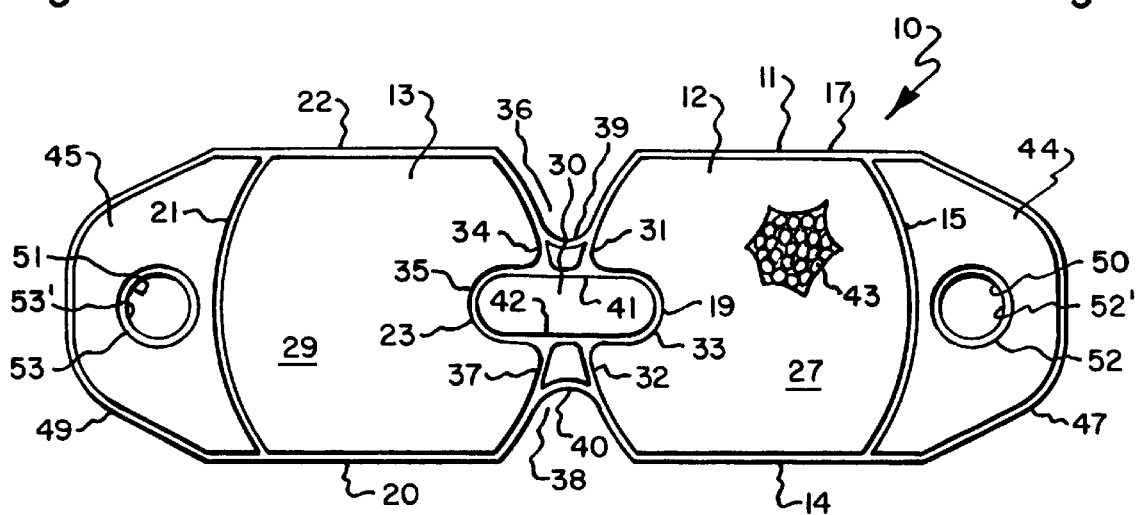
FIG. 2 is a partially broken away plan view of the adsorbent unit showing the less pronounced convex surface portions thereof.

After the connecting member 30 has been placed between conduit portions 73 and 74, tabs 44 and 45 are hooked onto filter housing 77 to constitute an anchoring yoke. Filter housing 77 is an external structural member relative to adsorbent unit 10. More specifically, tab 45 is first hooked over filter housing 77 by forcing the filter housing through aperture 51 in tab 45, and thereafter tab 44 is mounted on filter housing 77 by forcing the latter through aperture 50. The fused seams 52 and 53 which border apertures 50 and 51, respectively, act as relatively rigid grommets. The filter housing 77 has a pronounced outwardly-extending rim 78 which enhances the retention of tabs 44 and 45 on filter housing 77. The pronounced arcuate surfaces 24 and 25 of containers 12 and 13, respectively, abut each other (FIG. 10), and this provides a resilience which forces the outer edge portions 52' and 53' (FIG. 2) of the grommets to abut the filter housing 77, as can be visualized from FIG. 10. Furthermore, since the pronounced convex surfaces 24 and 25 of containers 12 and 13, respectively, are located between conduits 73 and 74 and return bend 72, the adsorbent unit 10 is maintained in position because of an essentially complimentary mating relationship between the contacting portions of pronounced convex surfaces 24 and 25 and return bend portions 72, 73 and 74.

When the adsorbent unit 10 is assembled onto U-bend 62 in the above-described manner, it will retain the position shown in FIG. 5 so that the insertion of the U-bend pipe into lower accumulator portion 59 is facilitated without any requirement for using a band or a tie for maintaining the containers 12 and 13 in position against the U-bend pipe 62.

Figure 11:
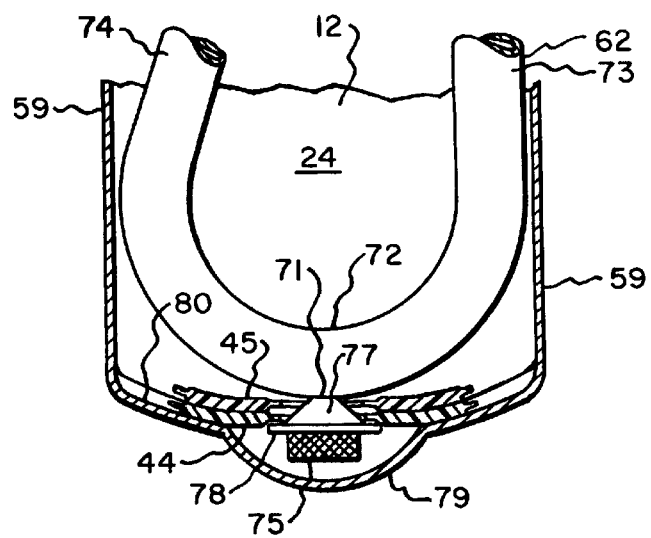
FIG. 11 is a cross sectional view taken substantially along line 11—11 of FIG. 8.

As can be seen from FIG. 11, the filter 75 is received in the concave depression 79 of lower accumulator portion 59 from which lubricant is aspirated into return bend 72. It is to be especially noted that portions of the tabs 44 and 45 are pressed between the return bend 72 and the lower inner surface 80 of the accumulator portion 59 to thereby further retain the adsorbent unit 10 firmly in position.

It can thus be seen that while the tabs 44 and 45 are merely tabs when the adsorbent unit is not mounted on the U-bend tube 62, they became a yoke when the tabs are mounted on filter housing 77 in the sense that the tabs both serve to tie the adsorbent containers 12 and 13 to each other and also mount them relative to U-bend pipe 62.

While the above description has shown connecting member 30 as having its cutouts 36 and 38 of unequal depth because of the fact that the U-bend pipe is not symmetrical about a vertical axis, it will be appreciated that an adsorbent unit can have a connecting member such as 30 with cutouts of equal depth for use with a symmetrical U-bend pipe. Also, while the sides of the container 11 have been described as being fabricated of heat-fusible polyester, other heat-fusible materials can be used if fused seams are desired, or, if desired, the containers such as 12 and 13 may have seams which are sewn or fabricated in any other suitable manner.

Figure 3:
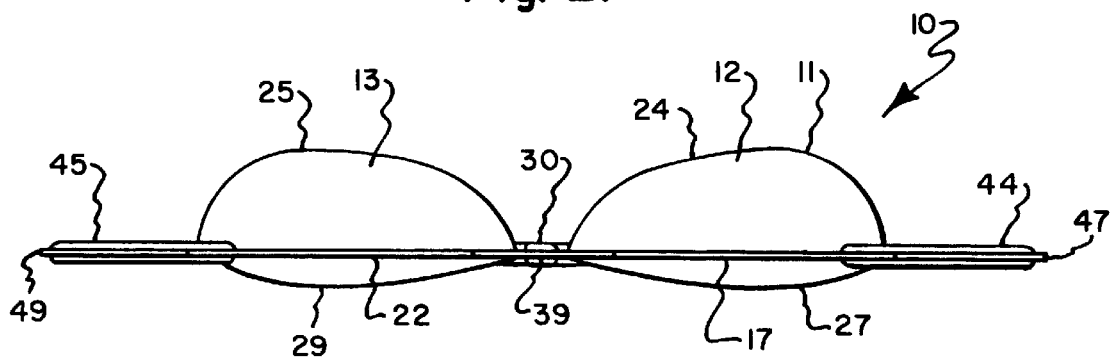
FIG. 3 is a side elevational view taken substantially in the direction of arrows 3—3 of FIG. 1.

In FIGS. 12 and 13 another embodiment of the present invention is shown. The adsorbent unit 90 is generally similar to the adsorbent unit 10 of FIGS. 1–11 but it differs therefrom in certain respects, primarily in the nature of the tabs 91 and 92 and in the relative sizes of the containers 93 and 94. In this respect container 93 is larger than container 94, and this is necessitated because of the fact that container 94 has a tab 92 which is threaded through aperture 95 in tab 91 so that the connected tabs 91 and 92 function as a yoke for mounting the adsorbent unit 90 in the U-bend 62. Containers 93 and 94 have relatively convex sides 97 and 99, respectively, which correspond to relatively convex container sides 24 and 25, respectively, of FIG. 3, and they perform the same function. Sides 100 and 101 of containers 93 and 94 are less convex than sides 97 and 99 and they correspond to sides 27 and 29, respectively, of FIG. 3. The adsorbent unit 90 has fused seams, such as described above relative to FIGS. 1–11, and it is deemed that these fused seams are adequately shown in FIG. 12, and therefore a detailed description is omitted. However, these fused seams are designated by primed numerals which correspond to the unprimed numerals of FIG. 1, and the corresponding numerals represent analogous structure. Additionally, as can be seen from FIG. 13, the adsorbent unit 90 includes a desiccant in the same manner as the embodiment of FIGS. 1–11. Additionally, adsorbent unit 90 includes a connecting member 102 which is analogous to connecting member 30 of FIG. 2, and there are arcuate cutouts or spaces 103 and 104 on opposite sides of connecting member 102, and these correspond to cutouts 38 and 36, respectively, of FIG. 2, and they function in the same manner relative to conduit portions 74 and 73, respectively.

Adsorbent unit 90 is mounted on conduit 62 in the following manner. The connecting member 102 is placed between tube portions 73 and 74, which are shown in FIG. 6. The arcuate cutout or space 104 is shallower than the arcuate cutout or space 103. Thus, when the connecting member 102 is placed between pipe portions 73 and 74, the cutout 104 receives the vertical pipe portion 73 and the cutout 103 receives inclined pipe portion 74. Thus, the containers 93 and 94 will be oriented as shown in FIG. 5 with the fused seams 14', 17', 20' and 22' of the containers substantially parallel to the sides of receiver portion 59.

Tab 91 includes an aperture 105 bounded by fused seam 107, and tab 91 is hooked over filter housing 77 by forcing the latter through aperture 105. The fused seam 107 acts as a relatively rigid grommet. Thereafter, the barbed end 109 of tab 92 is threaded through aperture 95 of tab 91. Aperture 95 is bordered by a fused seam 108. Tab 92, in addition to having barb 109 at its outer end has an intermediate body portion 110 which connects barb 109 to container 94. The barbed tab 92 is formed by fusing the two sides 99 and 101 of container 94 together by suitable heat and pressure. Thus, the embodiment of FIGS. 12 and 13 is mounted on U-tube 62 in a slightly different manner than the embodiment of FIGS. 1–11 in that in the former yoke portion or tab 91 is mounted on the filter housing 77 and the other tab 92 is threaded through an aperture in tab 91 so that they collectively function as a yoke when they are assembled to each other, whereas in the embodiment of FIGS. 1–11 tabs 44 and 45 function as a yoke when they are mounted on the filter housing 77.

While preferred embodiments of the present invention have been disclosed, it will be appreciated that the present invention is not limited thereto but may be otherwise embodied within the scope of the following claims.

I claim:

1. An adsorbent unit comprising first and second porous fabric adsorbent containers, adsorbent in said first and second containers, inner and outer end portions on said first and second containers, a connecting member connecting said inner end portions of said first and second containers, a first tab extending outwardly from said outer end portion of said first container, a second tab extending outwardly from said outer end portion of said second container, and aperture means in at least one of said first and second tabs for mounting said adsorbent unit on a structural member which is external thereto.

2. An adsorbent unit as set forth in claim 1 wherein said first and second containers each include a pronounced convex side and a less pronounced convex side.

3. An adsorbent unit as set forth in claim 1 wherein said connecting member includes first edges which are connected to said inner end portions of said containers, and second concave edges which extend between said first edges and which define cutouts between said first and second containers.

4. An adsorbent unit comprising first and second porous fabric adsorbent containers, adsorbent in said first and second containers, inner and outer end portions on said first and second containers, a connecting member connecting said inner end portions of said first and second containers, a first tab extending outwardly from said outer end portion of said first container, a second tab extending outwardly from said outer end portion of said second container, an aperture in at least one of said first and second tabs for mounting said tab on an external structural member, said connecting member including first edges which are connected to said inner end portions of said containers, and second concave edges which extend between said first edges and which define cutouts between said first and second containers, said cutouts being of different depths.

5. An adsorbent unit as set forth in claim 3 wherein said first and second containers each include a pronounced convex side and a less pronounced convex side.

6. An adsorbent unit comprising first and second porous fabric adsorbent containers, adsorbent in said first and second containers, inner and outer end portions on said first and second containers, a connecting member connecting said inner end portions of said first and second containers, a first tab extending outwardly from said outer end portion of said first container, a second tab extending outwardly from said outer end portion of said second container, an aperture in at least one of said first and second tabs for mounting said tab on an external structural member, said first and second containers each including a pronounced convex side and a less pronounced convex side, and said cutouts being of different depths.

7. An adsorbent unit as set forth in claim 3 wherein said connecting member is substantially planar.

8. An adsorbent unit as set forth in claim 7 wherein said first and second containers each include a pronounced convex side and a less pronounced convex side.

9. An adsorbent unit comprising first and second porous fabric adsorbent containers, adsorbent in said first and second containers, inner and outer end portions on said first and second containers, a connecting member connecting said inner end portions of said first and second containers, a first tab extending outwardly from said outer end portion of said first container, a second tab extending outwardly from said outer end portion of said second container, an aperture in at least one of said first and second tabs for mounting said tab on an external structural member, said connecting member including first edges which are connected to said inner end portions of said containers, and second concave edges which extend between said first edges and which define cutouts between said first and second containers, said connecting member being substantially planar, said first and second containers each including a pronounced convex side and a less pronounced convex side, and said cutouts being of different depths.

10. An adsorbent unit as set forth in claim 1 wherein said first and second tabs are substantially planar.

11. An adsorbent unit as set forth in claim 10 wherein said connecting member includes first edges which are connected to said inner end portions of said first and second containers, and wherein said connecting member includes second edges which extend between said first edges and in combination with said inner end portions of said containers define cutouts between said first and second containers.

12. An adsorbent unit comprising first and second porous fabric adsorbent containers, adsorbent in said first and second containers, inner and outer end portions on said first and second containers, a connecting member connecting said inner end portions of said first and second containers, a first tab extending outwardly from said outer end portion of said first container, a second tab extending outwardly from said outer end portion of said second container, an aperture in at least one of said first and second tabs for mounting said tab on an external structural member, said first and second tabs being substantially planar, said connecting member including first edges which are connected to said inner end portions of said first and second containers, and said connecting member also including second edges which extend between said first edges and in combination with said inner end portions of said containers define cutouts between said first and second containers, said cutouts being of different depths.

13. An adsorbent unit as set forth in claim 11 wherein said connecting member is substantially planar.

14. An adsorbent unit as set forth in claim 13 wherein said first and second containers each include a pronounced convex side and a less pronounced convex side.

15. An adsorbent unit comprising first and second porous fabric adsorbent containers, adsorbent in said first and second containers, inner and outer end portions on said first and second containers, a connecting member connecting said inner end portions of said first and second containers, a first tab extending outwardly from said outer end portion of said first container, a second tab extending outwardly from said outer end portion of said second container, an aperture in at least one of said first and second tabs for mounting said tab on an external structural member, said first and second tabs being substantially planar, said connecting member including first edges which are connected to said inner end portions of said first and second containers, and said connecting member also including second edges which extend between said first edges and in combination with said inner end portions of said containers define cutouts between said first and second containers, said connecting member being substantially planar, said first and second containers each including a pronounced convex side and a less pronounced convex side, and said cutouts being of different depths.

16. In a refrigerant accumulator having a housing with a bottom wall and a side wall and a U-shaped pipe with a return bend adjacent said bottom wall and with first and second pipe portions extending upwardly from said return bend along said side wall, said refrigerant receiver also including a filter body extending outwardly from said return bend, the improvement of an adsorbent unit comprising first and second porous fabric adsorbent containers, adsorbent in said first and second containers, inner and outer end portions on said first and second containers, a connecting member connecting said inner end portions of said first and second containers, said connecting member being positioned between said first and second pipe portions in a position spaced from said return bend, a first tab extending outwardly from said outer end portion of said first container, an aperture in said first tab mounting said first tab on said filter body, a second tab extending outwardly from said outer end portion of said second container, a connection between said first and second tabs, said first tab including a portion underlying said return bend and positioned between said return bend and said bottom wall, said first and second tabs functioning as an anchored yoke to retain said adsorbent unit mounted relative to said return bend of said U-shaped pipe.

17. In a refrigerant accumulator as set forth in claim 16 wherein said containers include convex sides which fit between said first and second pipe portions and abut each other.

18. In a refrigerant accumulator as set forth in claim 16 wherein said connecting member includes outer edges which lie in adjacent relationship to said first and second pipe portions.

19. In a refrigerant accumulator as set forth in claim 18 wherein said U-shaped pipe includes a substantially vertical pipe portion and an inclined pipe portion, and wherein said outer edges of said connecting member and portions of said inner end portions of said first and second containers lying outwardly of said outer edges of said connecting member define a relatively shallow cutout to receive said vertical pipe portion and a relatively deep cutout to receive said inclined pipe portion.

20. In a refrigerant accumulator as set forth in claim 19 wherein said containers include convex sides which fit between said first and second pipe portions and abut each other.

21. In a refrigerant accumulator as set forth in claim 18 wherein said containers include convex sides which fit between said first and second pipe portions and abut each other.

22. In a refrigerant accumulator as set forth in claim 18 wherein said connecting member is substantially planar.

23. In a refrigerant accumulator as set forth in claim 22 wherein said U-shaped pipe includes a substantially vertical pipe portion and an inclined pipe portion, and wherein said outer edges of said connecting member and portions of said inner end portions of said first and second containers lying outwardly of said outer edges of said connecting member define a relatively shallow cutout to receive said vertical pipe portion and a relatively deep cutout to receive said inclined pipe portion.

24. In a refrigerant accumulator as set forth in claim 23 wherein said containers include convex sides which fit between said first and second pipe portions and abut each other.

25. In a refrigerant accumulator as set forth in claim 16 wherein said tabs are substantially planar.

26. In a refrigerant accumulator as set forth in claim 25 wherein said connecting member includes outer edges which lie in adjacent relationship to said first and second pipe portions.

27. In a refrigerant accumulator as set forth in claim 26 wherein said U-shaped pipe includes a substantially vertical pipe portion and an inclined pipe portion, and wherein said outer edges of said connecting member and portions of said inner end portions of said first and second containers lying outwardly of said outer edges of said connecting member define a relatively shallow cutout to receive said vertical pipe portion and a relatively deep cutout to receive said inclined pipe portion.

28. In a refrigerant accumulator as set forth in claim 26 wherein said connecting member is substantially planar.

29. In a refrigerant accumulator as set forth in claim 28 wherein said containers include convex sides which fit between said first and second pipe portions and abut each other.

30. An adsorbent unit for mounting relative to a U-bend pipe of a refrigerant accumulator having spaced pipes and a return bend having a filter body on its underside comprising first and second porous fabric containers, adsorbent in said first and second porous containers, inner and outer end portions on said first and second containers, connecting means for connecting said inner end portions of said first and second containers and for positioning said inner end portions between said spaced pipes of said U-bend, and first and second tab means at said outer ends of said first and second containers, respectively, for mounting said adsorbent unit on said filter body of said U-bend pipe.

31. An adsorbent unit as set forth in claim 30 wherein each of said first and second porous fabric containers have first and second convex sides, respectively, which abut each other when said adsorbent unit is mounted on said U-bend pipe.

32. An adsorbent unit as set forth in claim 30 wherein said adsorbent unit includes cutout means of different depths on opposite sides of said connecting means for receiving said spaced pipes.

33. An adsorbent unit as set forth in claim 32 wherein each of said first and second porous fabric containers have first and second convex sides, respectively, which abut each other when said adsorbent unit is mounted on said U-bend pipe.

34. An adsorbent unit comprising first and second porous fabric adsorbent containers, adsorbent in said first and second containers, inner and outer end portions on said first and second containers, a connecting member connecting said inner end portions of said first and second containers, a first tab extending outwardly from said outer end portion of said first container, a second tab extending outwardly from said outer end portion of said second container, an aperture in at least one of said first and second tabs for mounting said tab on an external structural member, a second aperture in one of said first and second tabs, and an end portion on the other of said first and second tabs for threading through said second aperture.

35. An adsorbent unit as set forth in claim 34 wherein said end portion comprises a barb.

36. An adsorbent unit as set forth in claim 1 including a connection between said first and second tabs.

37. An adsorbent unit comprising first and second containers, adsorbent in said first and second containers, inner and outer end portions on said first and second containers, a connecting member connecting said first and second containers, first edges on said connecting member connected to said inner end portions of said first and second containers, second edges on said connecting member which extend between said first edges of said connecting member, and cutouts of different depths in said second edges.

38. In a refrigerant accumulator having a housing with a bottom wall and a side wall and a U-shaped pipe with a return bend adjacent said bottom wall and with first and second pipe portions extending upwardly from said return bend along said side wall, said refrigerant receiver also including a filter body extending outwardly from said return bend, the improvement of an adsorbent unit comprising first and second porous fabric adsorbent containers, adsorbent in said first and second containers, inner and outer end portions on said first and second containers, a connecting member connecting said inner end portions of said first and second containers, said connecting member being positioned between said first and second pipe portions in a position spaced from said return bend, a tab extending outwardly from said outer end portion of said first container, and an aperture in said tab mounting said tab on said filter body.

39. In a refrigerant accumulator as set forth in claim 38 including a second tab extending outwardly from said outer portion of said second container.

* * * * *

UNITED STATES PATENT AND TRADEMARK OFFICE
CERTIFICATE OF CORRECTION

PATENT NO. : 5,802,868
DATED : September 8, 1998
INVENTOR(S) : Paul A. Riemenschneider It is certified that error appears in the above-identified patent and that said Letters Patent is hereby corrected as shown below:

Column 10, line 40 (claim 39), after "outer" insert --end--.

Signed and Sealed this

Twenty-second Day of December, 1998

Attest:

BRUCE LEHMAN

*Attesting Officer*     *Commissioner of Patents and Trademarks*